Figure 5:
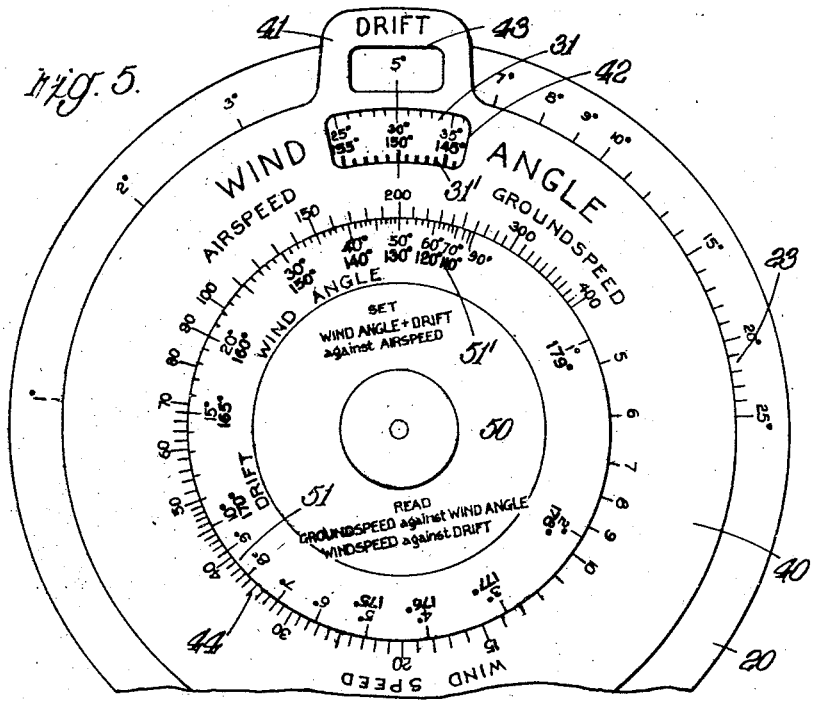

Oct. 29, 1946.   P. GOUDIME-LEVKOVITSCH   2,410,210
COMPUTER OF THE SLIDE RULE TYPE
Filed July 7, 1943   4 Sheets-Sheet 1
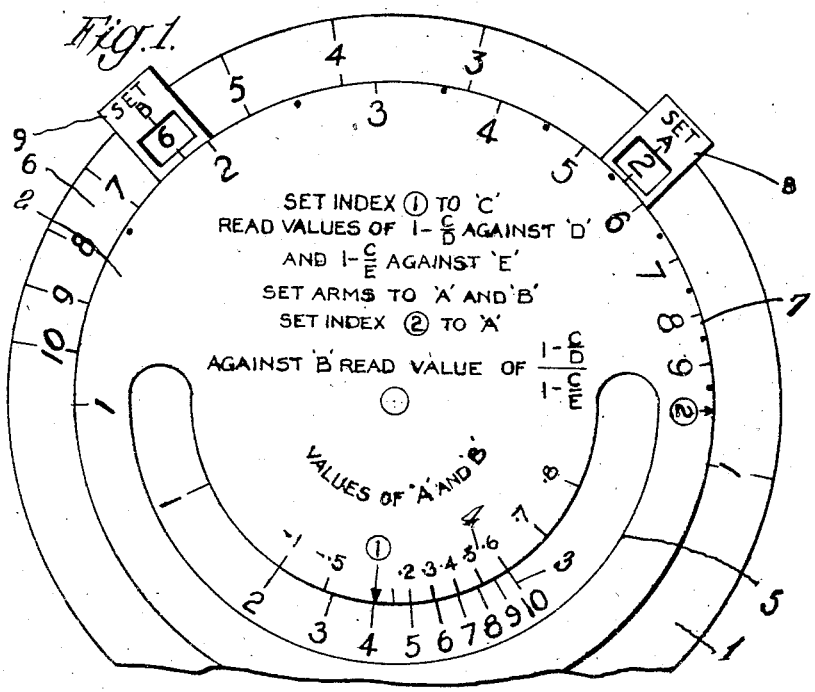
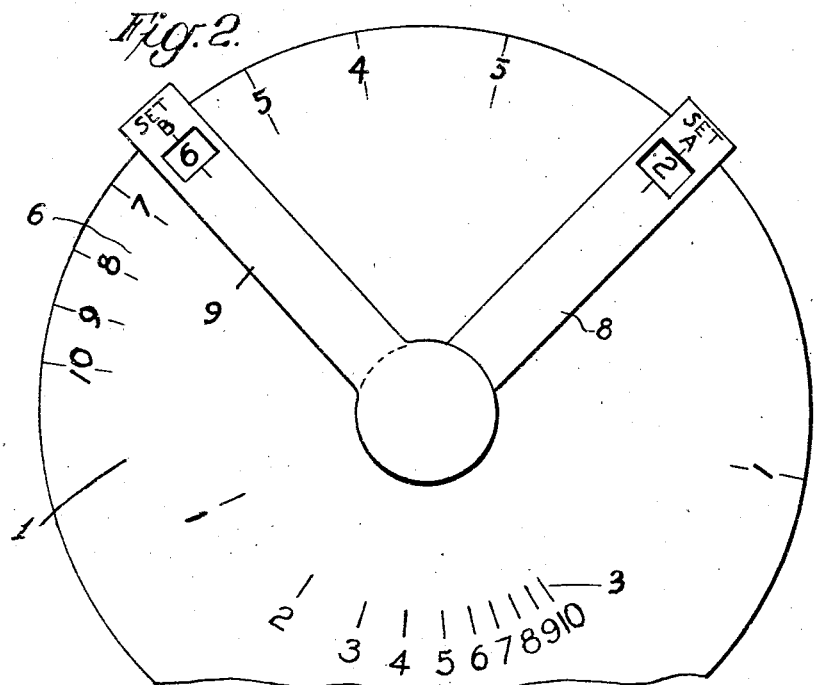

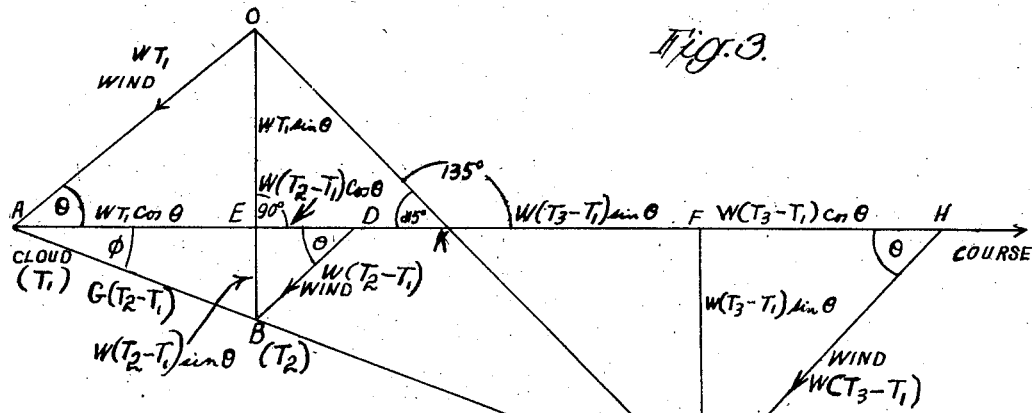
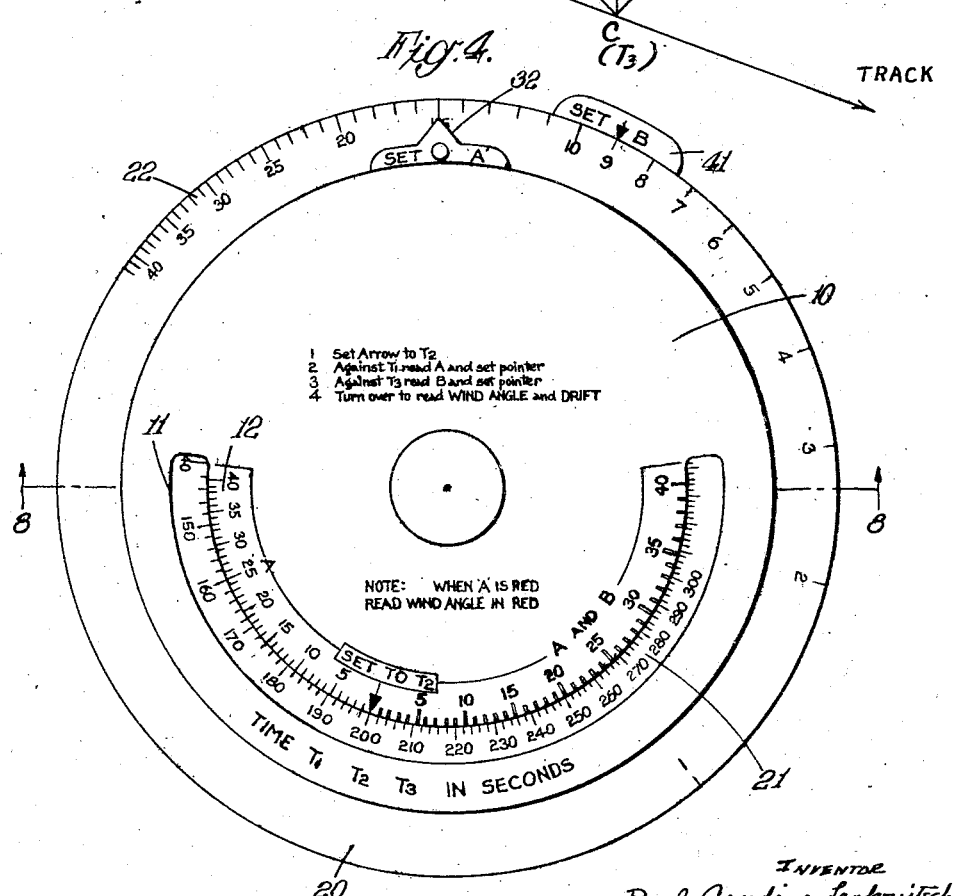

Oct. 29, 1946.   P. GOUDIME-LEVKOVITSCH   2,410,210
COMPUTER OF THE SLIDE RULE TYPE
Filed July 7, 1943   4 Sheets-Sheet 4

INVENTOR
Paul Goudime-Levkovitsch
By Watson, Cole, Grindle & Watson
ATTYS

Patented Oct. 29, 1946

2,410,210

UNITED STATES PATENT OFFICE 2,410,210

COMPUTER OF THE SLIDE RULE TYPE

Paul Goudime-Levkovitsch, Wentworth, England, assignor to Simmonds Aerocessories Limited, London, England Application July 7, 1943, Serial No. 493,774
In Great Britain July 29, 1942

2 Claims. (Cl. 235—84)

This invention relates to computers of the slide rule type and more particularly but not exclusively to computers adapted for solving certain problems which occur in air navigation.

The conventional way of solving on a slide rule an equation of the form $$1 - \frac{C}{D} = x \qquad (1)$$

where C and D represent variables is first to determine the value of C/D and then to subtract the value found from 1 in order to find $x$.

In the improved computer according to the present invention there is combined with an ordinary logarithmic scale of numbers (hereinafter referred to as the main scale), a relatively movable auxiliary scale whereby the value $$1 - \frac{C}{D}$$

may be read off directly.

The main scale is plotted in accordance with the expression $d' = K \log y'$, where $d'$ is the linear distance from the origin or index of the scale of any given graduation $y'$, and K is a constant of proportionality. The auxiliary scale is plotted in accordance with the expression $$d = K \log \left(\frac{10^n}{10^n - y}\right)$$

where $d$ is the linear distance from the origin or index of the scale of any given graduation $y$, $n$ is a whole number, chosen according to the decade over which $y$ is to be measured, such that the value of $$K \log \left(\frac{10^n}{10^n - y}\right)$$

remains positive at the maximum value of $y$, and K is the same constant of proportionality as that used in plotting the main scale.

In the use of a computer having such an auxiliary scale, the index of the auxiliary scale is set against the value of C on the main scale and against the value of D on the main scale the value of $x$ is read off directly on the auxiliary scale.

That such a pair of cooperating scales may be used to determine the value of $$1 - \frac{C}{D}$$

directly may be shown in the following manner. With the index of the auxiliary scale set against any graduation $y_1'$ on the main scale, if $d_1'$ be the distance from the index of the main scale to the graduation $y_1'$, $d_2'$ be the distance from the index of the main scale to another graduation $y_2'$ on the main scale, where C and D represent variables, and $d_3$ be the distance from the index of the auxiliary scale to the graduation $y_3$ on that scale which is opposite the graduation $y_2'$ on the main scale, then $d_3 = d_2' - d_1'$. From the definition of the scales, $d_1' = K \log y_1'$, $d_2' = K \log y_2'$ and $$d_3 = K \log \left(\frac{10^n}{10^n - y_3}\right)$$

and substitution of these values in the equation $d_3 = d_2' - d_1'$ gives $$K \log \left(\frac{10^n}{10^n - y_3}\right) = K \log y_2' - K \log y_1' = K \log \frac{y_2'}{y_1'}$$

i. e.

$$\frac{10^n}{10^n - y_3} = \frac{y_2'}{y_1'}$$

or $$y_3 = 10^n \left(1 - \frac{y_1'}{y_2'}\right)$$

In the particular case under consideration, $y_1' = C$ and $y_2' = D$ so that $$y_3 = 10^n \left(1 - \frac{C}{D}\right)$$

the auxiliary scale thus providing a means whereby the value $$1 - \frac{C}{D}$$

may be determined without the previous determination of the value C/D.

The auxiliary scale may be embodied in a computer of the linear or circular type, and it will be seen that for a different value of D, say D', the value $$1 - \frac{C}{D'}$$

can also be directly read off on the auxiliary scale without altering the setting of the scales. This principle may be made use of to solve equations of the form $$\frac{1 - \frac{C}{D}}{1 - \frac{C}{E}} = z \qquad (2)$$

For convenience, the factor $$1 - \frac{C}{D}$$

will be called "A" and the factor $$1 - \frac{C}{E}$$

will be called "B." Equation 2 then becomes $$\frac{A}{B} = z$$

One convenient form of computer for solving Equation 2 is illustrated in Figures 1 and 2 of the accompanying drawings, Figure 1 being a top plan view of the computer and Figure 2 a similar view of the computer with the upper disc removed.

The computer comprises two concentric, superposed, relatively rotatable discs, the lower disc 1 having a greater diameter than the upper disc 2. On the lower disc and beneath the upper disc a circular main scale 3 is engraved and a portion of this scale is visible through an arcuate window 5 in the upper disc. The auxiliary scale 4, derived as shown above, is engraved around the inner edge of the window in the upper disc.

The first stage in solving the equation is to determine the values of A and B. The upper disc 2 is rotated until the index of the auxiliary scale 4 is set to the value of C on the main scale, and opposite the values of D and E on the main scale the values of A and B respectively are read off directly on the auxiliary scale. Dividing A by B will give $z$. For this purpose an additional logarithmic scale of numbers, 6, hereinafter called the "log A and B" scale, is engraved around the edge of the lower disc 1 and a further logarithmic scale of numbers, 7, called the "log $z$" scale, is engraved around the edge of the upper disc 2. Two radially-extending arms 8, 9, called "A" and "B," respectively, are arranged to rotate about the axis of the discs and to be set against the "log A and B" scale. This form of computer functions as follows:

The values of A and B having been determined, the movable arms A and B are set to the values which have been found. The upper disc 2 is then rotated so that the index of the log $z$ scale 7 comes opposite the arm A and then the value of $z$ may be read off directly on the log $z$ scale against the arm B.

Figure 1 shows the computer set for solving the equation $$\frac{1-\frac{4}{5}}{1-\frac{4}{10}}=z$$

The index of the auxiliary scale 4 is set against the numeral 4 on the main scale 3, the value of $1-\frac{4}{5}$ being given on the auxiliary scale opposite 5 on the main scale as 0.2, and the value of $1-\frac{4}{10}$ being given opposite 10 on the main scale as 0.6. From the values of A and B thus obtained, the value of $z$ is readily determined in the manner given above.

According to an important feature of the present invention, a computer of the type above described is adapted to solve a problem which occurs in air navigation when finding the wind speed and direction by what is known as the four point bearing method.

The procedure involved consists in timing the aircraft between certain intervals during which bearings are taken of a fixed object.

The aircraft flies on any desired course and when vertically over a selected object an artificial smoke cloud is released from the aircraft and a stop watch is started. The pilot then turns 180° and flies on a steady course. After about 90 seconds he makes another 180° turn and flies on a reciprocal course. If the turns have been correctly made the aircraft will now be heading straight for the smoke cloud, which will have drifted away from the object. The time of passing through the cloud is noted and is called $T_1$. The aircraft continues to fly on the same course and when the object is seen to bear 90° the time $T_2$ is taken; finally when the object bears 135° the time $T_3$ is taken.

Figure 3 illustrates the theory of the method when dealing with a headwind. When a tailwind is involved, the object comes abeam before the aircraft enters the smoke cloud and the time $T_1$ will be greater than $T_2$.

From the knowledge of the times, $T_1$, $T_2$, and $T_3$, and of the airspeed of the aircraft, the wind angle, i. e. the angle between the aircraft's course and the wind direction, the wind speed, the drift and the groundspeed may be found. Dealing first with the wind angle $\theta$, I have derived this as follows, reference being made to Figure 3, where:

O is the position of the object.
A, B and C are positions of the aircraft at times $T_1$, $T_2$ and $T_3$ respectively.
AH represents the course.
AC represents the track.
OA, DB and HC represent the direction of the wind.
$\theta$ = wind angle.
$\phi$ = drift angle.

From Fig. 3 it will be seen that, if W is the wind velocity, V is the air speed and G is the ground speed, that $$OA = WT_1$$
$$AE = WT_1 \cos \theta$$
$$OE = WT_1 \sin \theta$$
$$AB = G(T_2 - T_1)$$
$$BD = W(T_2 - T_1)$$
$$BE = W(T_2 - T_1) \sin \theta$$
$$ED = W(T_2 - T_1) \cos \theta$$
$$CH = W(T_3 - T_1)$$
$$CF = W(T_3 - T_1) \sin \theta$$
$$FH = W(T_3 - T_1) \cos \theta$$

and $$KF = W(T_3 - T_1) \sin \theta$$

and it can be shown that $$W \cos \theta = V\left(1 - \frac{T_1}{T_2}\right)$$

and also that $$W (\cos \theta + \sin \theta) = V\left(1 - \frac{T_1}{T_3}\right)$$

Eliminating W, and solving $$\frac{1-\frac{T_1}{T_2}}{1-\frac{T_1}{T_3}} = \frac{\cos \theta}{\cos \theta + \sin \theta} = \frac{1}{1 + \tan \theta}$$

or $$\frac{1-\frac{T_1}{T_3}}{1-\frac{T_1}{T_2}} = \tan \theta + 1$$

Rearranging the terms, this reduces to $$\frac{1-\frac{T_2}{T_3}}{\frac{T_2}{T_1}-1} = \tan \theta \qquad (3)$$

Calling $$\frac{T_2}{T_1}-1$$

A, and $$1-\frac{T_2}{T_3}$$

B, the equation becomes $$\frac{B}{A} = \tan \theta \qquad (4)$$

Figure 6:
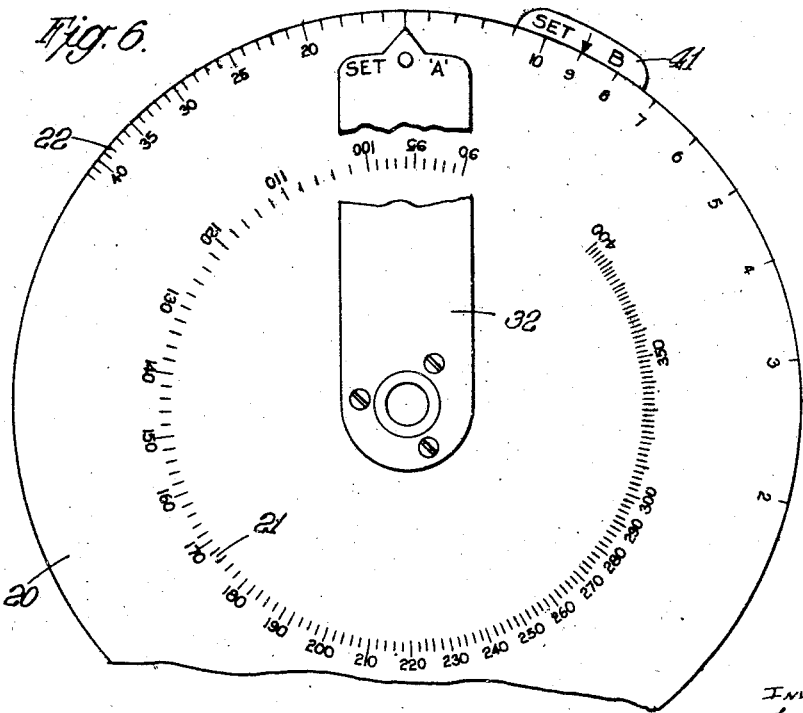
Figure 7:
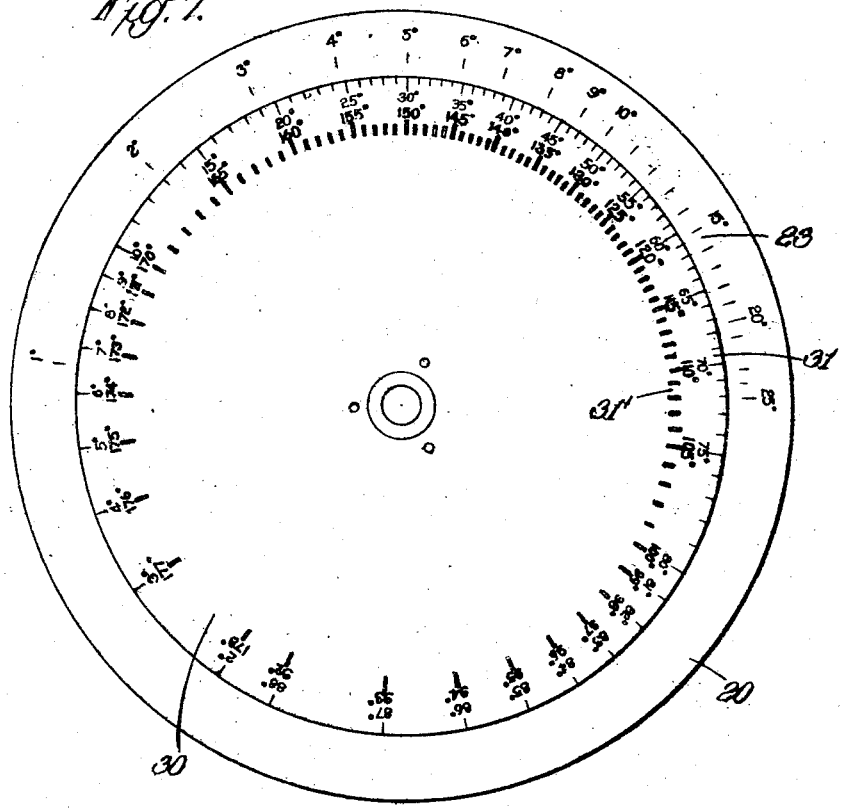
Figure 8:
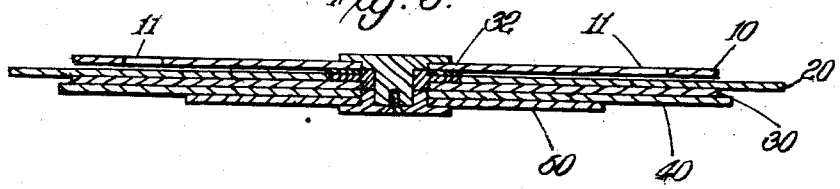

One form of computer for solving the above problem is shown in Figures 4 to 8 of the accompanying drawings, Figure 4 being a top plan view of the computer, Figure 5 a bottom plan view thereof, Figure 6 a top plan view of the computer with the uppermost disc removed, Figure 7 a bottom plan view of the computer with the two lowermost discs removed, and Figure 8 being a cross sectional view taken on line 8—8 of Figure 4.

The computer comprises two concentric relatively rotatable discs 10, 20, the lower disc 20 having a greater diameter than the upper disc 10. On disc 20 and beneath disc 10 the main scale 21 is engraved. This scale is called the time scale and corresponds to the times $T_1$, $T_2$, and $T_3$. A portion of the time scale 21 is visible through an acrcuate window 11 in disc 10. The auxiliary scale 12, which is similar to scale 4 of the computer shown in Figures 1 and 2, is engraved around the inner edge of window 11 in disc 10. A "log A and B" scale 22 (similar to scale 6 of Figures 1 and 2) is engraved around the periphery of disc 20.

A third concentric, relatively rotatable disc 30 is mounted immediately beneath disc 20 and this disc 30 bears a scale 31 of log tan $\theta$ called the wind angle scale. An arm 32 (the "A" arm) is secured to disc 30 so as to rotate therewith and reads against the "log A and B" scale 22, while a fourth concentric, relatively rotatable disc 40, mounted beneath disc 30, has an arm 41 (the "B" arm) which also reads against scale 22. The disc 40 has an arcuate window 42 through which a portion of scale 31 is visible.

In order to find the wind angle the index of the auxiliary scale 12 is set to the appropriate value of $T_2$ on the time scale 21. Opposite $T_1$ and $T_3$ on the time scale 21 the values of A and B respectively are read off on the auxiliary scale 12. The "A" and "B" arms 32, 41 are set to their respective values on the "log A and B" scale 22, and, on turning over the computer, the wind angle may be read off on its scale 31 against the "B" arm 41.

A convenient way of finding the wind speed with this form of computer is to utilize the angle of drift $\phi$. This may be read off directly since $\tan \phi = B$. This can be shown by reference to Figure 3 where it is seen that $$\tan \phi = \frac{EB}{EA} = \frac{BD \sin \theta}{OA \cos \theta}$$

Since $BD = W(T_2 - T_1)$ and $OA = WT_1$, it follows that $$\tan \phi = \frac{W(T_2 - T_1) \sin \theta}{WT_1 \cos \theta}$$

and thus that $$\tan \phi = \tan \theta \left(\frac{T_2}{T_1} - 1\right)$$

Substituting for $\tan \theta$ the value given in Equation 3, we have $$\tan \phi = \frac{1 - \frac{T_2}{T_3}}{\frac{T_2}{T_1} - 1}\left(\frac{T_2}{T_1} - 1\right) = 1 - \frac{T_2}{T_3} = B$$

Thus by marking off on the "log A and B" scale, values of $\phi$ such that $\phi$ is equal to $\tan^{-1} B$ the drift angle may be read off directly against the arm B at the same time that the wind angle $\theta$ is read off. In the computer shown in the drawings, however, a separate drift angle logarithmic scale 23 derived as already described is engraved on the reverse side of the disc 20, and a portion of this scale is visible through window 43 in arm 41.

The computer shown in the drawings is set to show the values of the wind angle and drift angle in the case of a headwind where:

| | |
|---|---|
| Course through cloud | 60° true |
| True airspeed | 150 knots |
| Bearing of object | To port |
| $T_1$ | 174 seconds |
| $T_2$ | 200 seconds |
| $T_3$ | 220 seconds |

From the front of the computer it is seen that the values of "A" and "B" respectively are 15 and 9 and with the "A" and "B" arms set to these values on the "log A and B" scale 22, the wind angle 30° is read off on its scale against the "B" arm 41 and the drift angle 5° against the said arm on the drift angle scale 23.

As the object bears to port, the wind direction is 60−30° or 30° true, while the track is 60°+5° or 65° true.

The wind speed W and groundspeed G are found by a separate calculation. For example as shown in the drawings, there may be engraved on disc 40 a circular logarithmic airspeed scale 44, numbered say 5–400 M. P. H., while on a fifth concentric, relatively rotatable disc 50 arranged beneath disc 40 there may be engraved a circular logarithmic sine scale 51 which reads against the airspeed scale 44. By the sine formula $$\frac{W}{\sin \phi} = \frac{G}{\sin \theta} = \frac{V}{\sin (\theta + \phi)} \quad (5)$$

where V denotes the airspeed. Hence it is only necessary to set the airspeed V, against the sum of the wind angle and drift angle $(\theta + \phi)$ and read off directly the wind speed W against the drift angle $\phi$ and the ground speed G against the wind angle $\theta$.

In the example given above the sum of the wind angle and the drift is 35° and it will be seen from the drawings that, on setting the airspeed 150 against the angle 35°, the groundspeed 130 knots is read off against the wind angle 30° and the wind speed 23 knots is read off against the drift angle 5°.

As previously mentioned, in the case of a tailwind, $T_1$ will be greater than $T_2$. Thus $T_1$ will appear against the right hand portion of scale 12, i. e. that part of the scale marked "A and B" in the drawings. In the case of a tailwind, the wind angle scale 31' on disc 30 and the sine scale 51' on disc 50 are employed and means are preferably provided to remind the user that, for a tailwind case, these scales are used. For example, the part of scale 12 marked "A and B," and scales 31' and 51' may be in red, as indicated in the drawings by these scales being double lined, the other scales being in black.

The wind direction, the wind speed and the drift having been determined in the manner described above, the computer may then be used for finding the course to steer, the drift and the groundspeed for any new track. The angle which the wind makes with the proposed new track is determined and is called the new "wind angle+drift." Setting this value on the sine scale 51 on disc 50 against the airspeed on the airspeed scale 44 on disc 40 enables the new drift to be read off on scale 51 against the wind speed on scale 44 and the new groundspeed to be read off on scale 44 against the wind angle on scale 51.

The following example will make this clear:

Airspeed _____ 150 knots
Wind direction as found _____ 10° true
Wind speed as found _____ 21 knots
New track to be made good _____ 340° true The angle between the new track and the wind direction is 360°−340°+10°, or 30°, and this is called the new "wind angle+drift."

1. Set new wind angle+drift of 30° on scale 51 against the airspeed of 150 knots on scale 44.

2. Against the wind speed of 21 knots on scale 44 read off on scale 51 the drift on the new course of 4°.

3. Against the wind angle 260° (30°−4°) on scale 51 read off on scale 44 the groundspeed on the new course of 130 knots.

Hence the new course is 340°+4°=344° true.

I claim:

1. In a computer of the slide rule type for computing wind direction by the four point bearing method, a member having a scale which is plotted in accordance with the expression $d'=K \log y'$, where $d'$ is the linear distance from the origin of the scale of any given graduation $y'$ and $K$ is a constant of proportionality, and a second relatively movable member having a scale which cooperates with the first-mentioned scale and which is plotted in accordance with the expression $$d = K \log \left( \frac{10^n}{10^n - y} \right)$$

where $d$ is the linear distance from the origin of the scale of any given graduation $y$, $n$ is a whole number chosen according to the decade over which $y$ is to be measured, such that the value of $$K \log \left( \frac{10^n}{10^n - y} \right)$$

remains positive at the maximum value of $y$, and $K$ is the same constant of proportionality as that used in plotting the first-mentioned scale.

2. A computer of the slide rule type for solving an equation of the form $$1 - \frac{C}{D} = x$$

where C and D represent variables, said computer comprising a member having a scale which is plotted in accordance with the expression $d'=K \log y'$, where $d'$ is the linear distance from the origin of the scale of any given graduation $y'$ and $K$ is a constant of proportionality, and a second relatively movable member having a scale which cooperates with the first-mentioned scale and which is plotted in accordance with the expression $$d = K \log \left( \frac{10^n}{10^n - y} \right)$$

where $d$ is the linear distance from the origin of the scale of any given graduation $y$, $n$ is a whole number, chosen according to the decade over which $y$ is to be measured, such that the value of $$K \log \left( \frac{10^n}{10^n - y} \right)$$

remains positive at the maximum value of $y$, and $K$ is the same constant of proportionality as that used in plotting the first-mentioned scale.

PAUL GOUDIME-LEVKOVITSCH.